United States Patent
Goodson et al.

(10) Patent No.: US 7,281,546 B2
(45) Date of Patent: Oct. 16, 2007

(54) THREAD PROTECTION SYSTEM WITH WEATHER BARRIER

(75) Inventors: H. Dean Goodson, Houston, TX (US); Robert D. Gibbens, Kingwood, TX (US); James G. Kelley, Crosby, TX (US)

(73) Assignee: Hunting Energy Services, Inc., Houston, TX (US)

( * ) Notice: Subject to any disclaimer, the term of this patent is extended or adjusted under 35 U.S.C. 154(b) by 480 days.

(21) Appl. No.: 10/664,083

(22) Filed: Sep. 17, 2003

(65) Prior Publication Data

US 2004/0200525 A1  Oct. 14, 2004

Related U.S. Application Data

(63) Continuation-in-part of application No. 10/412,157, filed on Apr. 11, 2003, now abandoned.

(51) Int. Cl.
*B65D 59/06* (2006.01)
(52) U.S. Cl. .................. 138/96 T; 138/89; 138/96 R
(58) Field of Classification Search ............. 138/89, 138/96 T, 96 R
See application file for complete search history.

(56) References Cited

U.S. PATENT DOCUMENTS

| | | | |
|---|---|---|---|
| 2,240,021 A | 4/1941 | Rutherford | 138/96 T |
| 2,737,205 A | 3/1956 | Stringfield | 138/89 |
| 3,578,027 A | 5/1971 | Zopfi | 138/89 |
| 3,822,902 A | 7/1974 | Mauer et al. | |
| 4,020,873 A | 5/1977 | Palarino | 138/96 T |
| 4,095,810 A | 6/1978 | Kulle | 277/208 |
| 4,210,179 A | 7/1980 | Galer | 248/96 T |
| 4,269,232 A | 5/1981 | Witschi | 138/96 R |
| 4,487,228 A | 12/1984 | Waldo et al. | 138/96 T |
| 4,672,366 A | 6/1987 | Butts | 340/605 |
| 4,677,177 A | 6/1987 | Shibanai et al. | 527/300 |
| 4,692,988 A | 9/1987 | Shulver et al. | 29/458 |
| 4,733,888 A | 3/1988 | Toelke | 285/4 |
| 4,757,595 A | 7/1988 | Fraering, Jr. | |
| 4,928,761 A * | 5/1990 | Gazda et al. | 166/123 |
| 5,303,743 A | 4/1994 | Vincent | 138/96 T |
| 5,452,749 A | 9/1995 | Johnson et al. | 238/96 T |
| 5,706,860 A | 1/1998 | Gonyen | 138/96 T |
| 6,367,508 B1 | 4/2002 | Richards et al. | 138/96 T |

FOREIGN PATENT DOCUMENTS

DE    42 30 887    3/1994

\* cited by examiner

*Primary Examiner*—Allan R. Kuhns
(74) *Attorney, Agent, or Firm*—Charles D. Gunter, Jr.

(57) ABSTRACT

A method and system are shown for protecting the threaded ends of tubular goods such as oil field tubulars from physical damage and corrosion due to environmental factors. A thread protector is formed of a polymeric body having cylindrical wall portions which engage the threaded ends of the tubular goods. Instead of relying upon a separate thread compound or corrosion inhibitor applied to the exposed threads, the polymeric body has incorporated therein a corrosion inhibiting compound, which is blended within the polymeric body as a part of the manufacturing process used to mold the polymeric body. The thread protector of the present disclosure includes a weather barrier to minimize exposure of the threaded ends of the tubular goods to moisture and other contaminants. The weather barrier includes a weather barrier ring and an air vent.

22 Claims, 6 Drawing Sheets

THREAD PROTECTION SYSTEM WITH WEATHER BARRIER

The present application is a continuation-in-part of application Ser. No. 10/412,157 filed Apr. 11, 2003 now abandoned.

BACKGROUND OF THE INVENTION

A. Field of the Invention:

The present invention relates to a method and system for protecting the threaded ends of pipes, such as oil field tubular goods, from physical damage and corrosion by providing a thread protecting end caps formed of a polymeric body having a corrosion inhibitor integrally molded therein and having a weather barrier system, and to a method for recycling used end protectors.

B. Description of the Prior Art

Drill pipe, tubing and casing—oil field tubular goods (OFTG)—for oil and gas drilling, completion, production and stimulation activities are typically held in a storage or pipe yard after they have been received from the fabricator or returned from downhole use. A major industry has developed in protection of such oil field tubular goods, also called "tubulars," to prevent them from corroding during periods of storage. The storage is not permanent, typically extending for a number of months or until a need arises for a specific size and grade of the tubular in question. The tubular goods are typically cleaned before storage in order to prepare them for shipment to the rig site at a future date. However, corrosion due to water and oxygen may quickly attack the precisely machined threads, which then cannot provide a satisfactory threaded connection. Pipe thread corrosion may be ordinary oxidation, or rust, or maybe aggravated by micro-organisms which feed on various materials on the surface of the thread, producing an acid which causes pitting of the threads.

The exposed threaded ends of tubular metal goods are conventionally protected by some sort of supplemental means in order to extend their storage life. For example, physical thread protectors in the form of plastic or elastomeric end caps or end caps made from metals such as steel, brass or copper have been placed on the threaded ends of tubular goods to provide protection from physical abuse and from corrosion. Chemical compositions which act as running compounds and/or corrosion inhibitors are also applied to the thread surface regions of the tubulars, which combined with thread protectors serve to function as a system to prevent impact and corrosion damage to the valuable and vital thread areas. For example, API (American Petroleum Institute) pipe dope (thread compound) is utilized, although it is generally low in corrosion inhibiting properties. Pipe dope is intended to be used as a running thread compound with lubricating and sealing properties. It is a thick grease based material which may contain lead, other heavy metals and filler materials to seal the thread passageways found in the threaded connection of oil field tubular goods. An example of a storage compound as opposed to a thread compound is a product sold under the trademark KENDEX that is a wax based material which is only applied to prevent or inhibit corrosion. Other lighter materials, such as a light oil might be utilized as well if the pipe is to be used within a day or two of the time it is threaded.

While in some cases the applied compounds and solids are captured and recycled, they are sometimes allowed to be discharged into the environment, presenting the problems of hazardous waste containment and removal. Once the tubulars are threaded the manufacturer must apply either a pipe dope or storage compound then apply a thread protector to prevent corrosion and/or impact damage. OFTG threads are frequently subjected to a series of inspections once shipped from the manufacturer. These inspections require the removal of the thread protector and the applied compound. The compound on the thread protector and the threaded ends must be treated as hazardous waste and therefore present an expensive containment and removal problem.

Pipe dope compositions are less than an optimum solution as a storage compound since these products do not offer sufficient anti-corrosion properties and often contain hazardous materials such as lead, copper, zinc, and hydrocarbons. Storage compounds cannot be used as an API thread running compound as they do not exhibit sufficient lubricity properties, sealing properties and must be cleaned from the threaded connection thoroughly before the API thread compound and sealant is employed.

The mechanical end caps or thread protectors have traditionally functioned primarily to protect the threads against impact damage if the pipe is accidentally dropped or bumped. Many of the prior art thread protectors are loose fitting "dust covers" and are of little value in preventing impact damage or the intrusion of moisture into the thread region. Certain of the prior art designs are "cup-shaped" and thus offer a tighter fit and incorporate moisture seals, such an O-rings, in an effort to improve corrosion protection.

The prior art end caps are generally removed near the well site and often are contaminated with immersed crude oil, pipe dope, drilling mud and accumulated tars and lighter oils that are found on the drill site. As a result, recycling the plastic or elastomeric polymers making up the prior art end caps has been economically unfeasible in many instances due to the cost of cleaning the waste polymer pieces for recycle processing.

A need exists for an improved end cap for protecting the threaded ends of oil field tubular goods from physical damage and corrosion which eliminates the need for pipe dopes, greases, heavy metal constituents, or hazardous materials used in the past.

A need also exists for such an end cap which has incorporated therein a corrosion inhibiting compound, the compound being integrally molded within the polymeric body.

A need also exists for an improved end protector composition which can be easily and economically recycled by eliminating the need of much of the cost of cleaning waste polymer pieces before recycle processing.

SUMMARY OF THE INVENTION

An improved thread protector is provided for tubular goods having threaded ends such as oil field tubular goods. The improved thread protector is formed of a polymeric body having cylindrical wall portions which engage the threaded ends of the tubular goods in order to protect the threaded ends from physical abuse as well as isolating the threaded ends from environmental corrosion. The polymeric body has incorporated therein a corrosion inhibiting compound, the compound being integrally molded within the polymeric body.

The polymeric body can be formed of a variety of conveniently available materials commonly used in the industry including polyethylene, polypropylene, high density polyethylene, polyurethane, polyvinylchloride, styrene-butadiene copolymers, acrylics and polycarbonates. The corrosion inhibitor which is incorporated within the polymeric body has a characteristic flash point which is selected to be above a mold temperature used to mold the polymeric body. Preferably, the polymeric body has incorporated therein from about 1 to 20% corrosion inhibitor by weight, based upon the total weight of the polymeric body.

In a typical application, a sealant composition is first applied to the threaded ends of the tubular. The thread protector, in the form of a physical end protector, is then installed on the threaded end of the tubular. The end protector is a polymeric body having a corrosion inhibitor integrally molded within the polymeric body and having cylindrical wall portions which engage the threaded ends of the tubular goods in order to protect the threaded ends from physical abuse as well as isolating the threaded ends from environmental corrosion.

A method of recycling used end caps used to protect threaded ends of oil field tubular goods is also described. A source of used end caps is first collected at a central location. The used end caps will typically have field residue remaining on the end caps. The used end caps are first shredded and ground to a desired particle size. The particles are then conveyed to a thermokinetic blender which mixes the particles at elevated temperatures to form a polymeric product. The polymeric product is discharged into a suitable mold which forms a molded polymeric product having cylindrical walls. The molded polymeric product is discharged from the mold and selected portions of the cylindrical walls thereof are threaded, whereby the threaded selected portions of the cylindrical walls matingly engage a selected end of the oil field tubular goods. The mold temperature used to mold the polymeric bodies is typically in the range from about 300-400° F. The polymeric bodies will have incorporated therein from about 1 to 20% corrosion inhibitor by weight, based upon the total weight of the polymeric body.

In another aspect, the improved thread protector of the present disclosure includes a weather barrier to minimize exposure of the threaded ends of the tubular goods to moisture and other contaminants. The weather barrier includes a weather barrier ring disposed between the thread protector and the tubular goods and an air vent in a transverse partition within the thread protector body. The weather barrier ring is disposed around the polymer body for providing a weather resistant seal between the polymer body and a surface of the tubular goods adjacent the threads on the tubular goods and away from an end of the tubular goods protected by the improved thread protector. The air vent is provided in a transverse partition within the polymer body for equalizing air pressure inside the tubular goods with air pressure outside the tubular goods while limiting the passage of moisture therethrough. These features may be utilized in addition to the corrosion inhibiting feature of the present invention wherein the polymeric body has incorporated therein a corrosion inhibiting compound that is blended into—i.e., integrally dispersed within—the polymeric body while it is being molded.

Additional objects, features and advantages will be apparent in the written description which follows.

DETAILED DESCRIPTION OF THE INVENTION

In the description which follows, oil field pipe or oil field casing is synonymous with "oil field tubular goods" (OFTG) or, simply, "tubular." A tubular end having external threads may be referred to as a "pin" and a tubular end having internal threads may be referred to as a "box." A pin protector or box protector may be generically referred to as an "end cap" or as a "thread protector."

Figure 1:
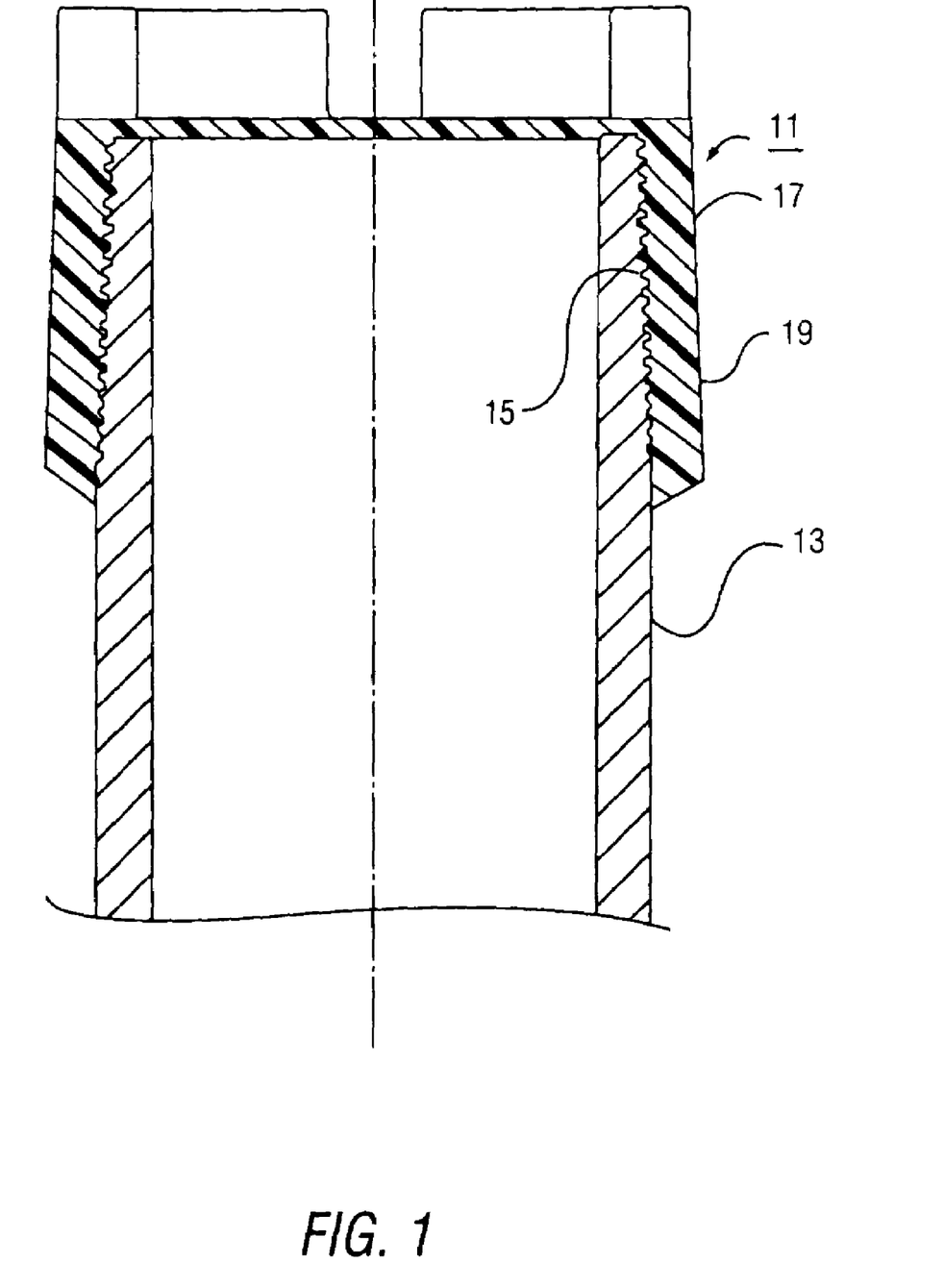
FIG. 1 is a partial, end view of the pin end of an oil field tubular showing an end protector of the invention in place thereon.

Referring now to FIG. 1 of the drawings, there is shown an improved thread protector 11 for a section of oilfield tubular goods, in this case, pin end 13 of a section of oil field casing. The tubular 13 has an externally threaded outer extent 15. The thread protector 11 includes a polymeric body 17 having cylindrical wall portions 19 which engage the threaded outer extent 15 of the tubular 13 in order to protect the threaded end from physical abuse as well as isolating the threaded end from environmental corrosion. In the discussion which follows, the term "polymeric body" is intended to encompass plastic, elastomeric and synthetic polymeric materials of the type typically utilized in the industry for end caps. The preferred polymeric body is formed from a material selected from the group consisting of polyethylene, polypropylene, high density polyethylene, polyurethane, polyvinylchloride, styrene-butadiene copolymers, acrylics and polycarbonates. A particularly preferred material for the polymeric body is high density polyethylene.

Figure 2:
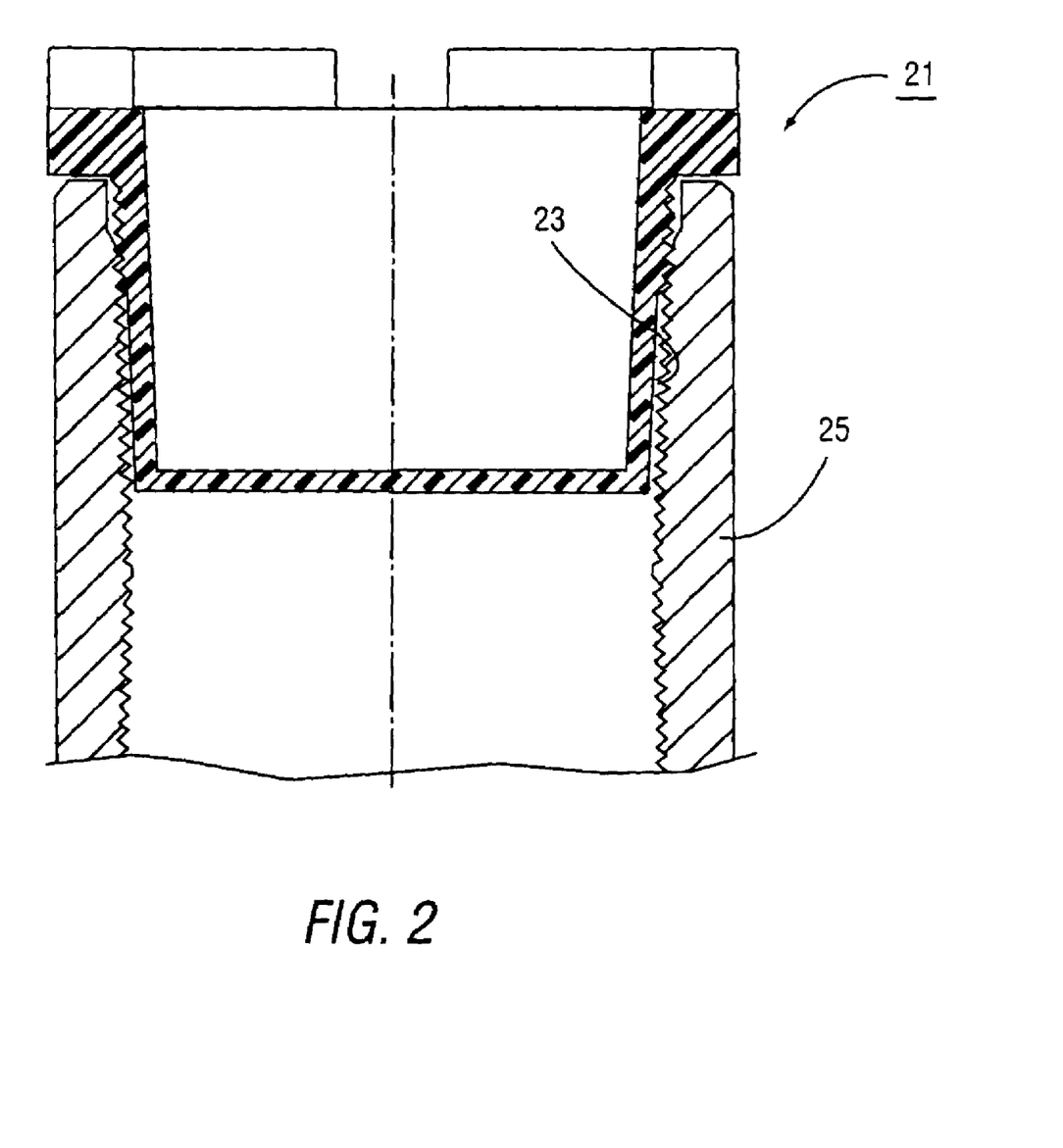
FIG. 2 is a view similar to FIG. 1 but showing a corresponding box end of an oil field tubular showing the end protector of the invention in place.

The end cap or thread protector 11 illustrated in FIG. 1 has internally threaded cylindrical sidewalls which engage the externally threaded pin end of the tubular 13. FIG. 2 shows a cup-shaped thread protector 21 which has externally threaded sidewalls for engaging the internally threaded, box end 25 of the tubular. The polymeric end cap protectors illustrated in FIGS. 1 and 2, which are examples of the Hunting Composite Gold Series protectors for API tubing, are typical of the prior art thread protectors in shape and overall function. Other typical examples of thread protectors commercially available from Hunting Composite of Houston, Tex., are the Hunting Composite Thread Protectors for API Casing and Tubing that are molded from high-density polyethylene, are covered by a protective steel shell, and are designed to cover the full thread length. The Hunting Composite Platinum Series Thread Protectors are also molded from high density polyethylene and compliment premium threads and sealing surfaces.

The thread protectors of the invention differ from the prior art in that the polymeric body 17 has incorporated therein a corrosion inhibiting compound which is integrally dispersed and molded within the polymeric body 17. In one preferred embodiment to be described, the improved thread protectors of the invention are formed by recycling used end caps. A number of commercially available corrosion inhibitors can be utilized in the method of the invention. The preferred corrosion inhibitor has a characteristic flash point with the flash point being selected to be above a mold temperature to mold the polymeric body. For example, one commercially available inhibitor is sold under the trade name NaSul 729 by King Industries of Norwalk, Conn. This inhibitor has a sulfonate percentage of 51.2% as measured by ASTM D 3049; a viscosity of 81.6 CPS as measured by ASTM D 445; a flash point of 160° C. (320° F.) and a specific gravity of 0.980 as measured by ASTM's D 4052.

Figure 3:
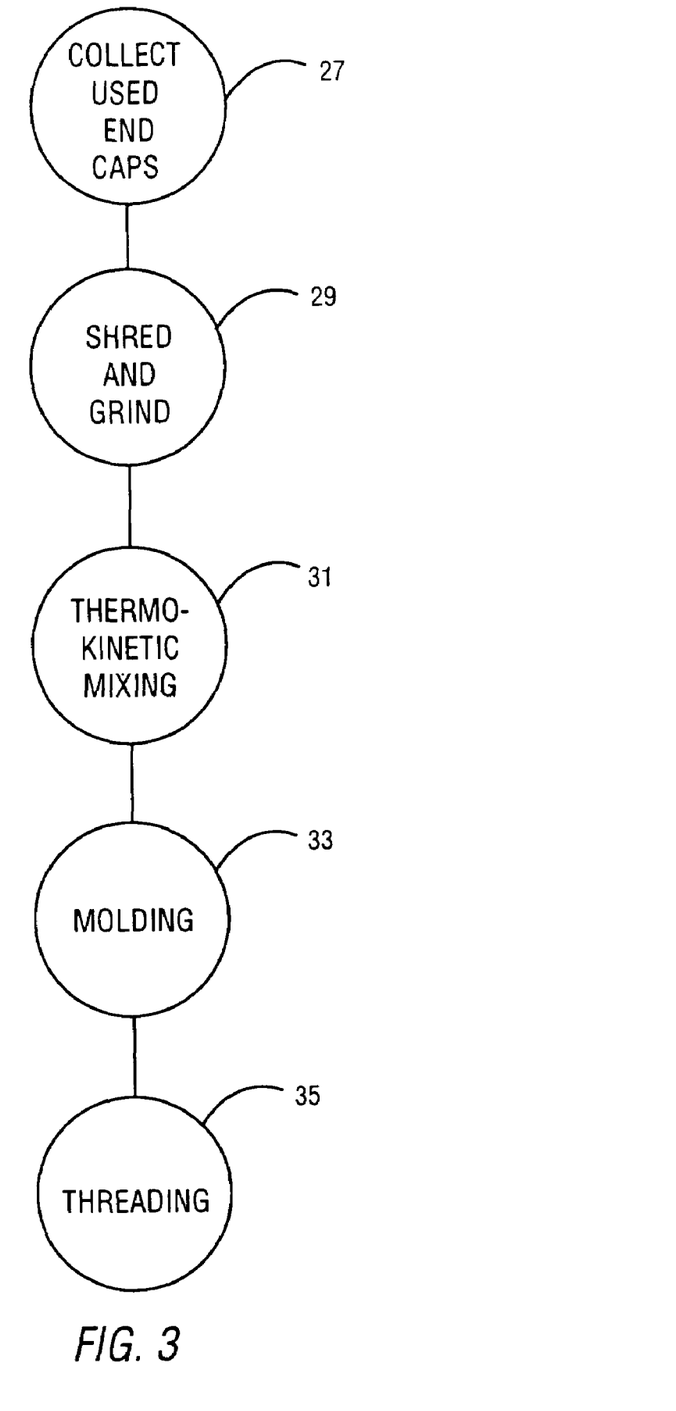
FIG. 3 is a simplified, schematic view of a method for recycling used end caps into the corrosion resistant protectors of the invention.

The corrosion inhibitor is typically present in the range from about 1 to 20% by weight, preferably about 5 to 15% by weight based on the total weight of the polymeric components. FIG. 3 is a simplified schematic which illustrates a preferred method of forming the thread protectors of the invention. In a particularly preferred embodiment, the thread protectors are manufactured by recycling used end caps which have been collected in a step 27, as shown in FIG. 3. The end caps can then be fed to a shredding and grinding step or steps 29 in which the end caps are reduced in size. The size of the shredded and ground particles is not critical but is typically on the order of 0.25-0.5 inches and may be pulverized to about 35 mesh or even to 100 mesh or finer. The ground up material is then fed to a thermokinetic mixer or compounder in step 31 to produce the molten, blended mixture. The corrosion inhibitor (or other materials) may thus be conveniently blended or impregnated into the polymeric material during the thermokinetic mixing step 31. Since the compounder heats the materials in the range from about 300-400° F., the corrosion inhibitor should have a flash point above the expected compounding temperature.

Thermokinetic mixers or compounders are described, for example, in issued U.S. Pat. No. 5,895,790 to Good, issued Apr. 20, 1999. This reference describes a thermokinetic compounder which can be used for melt blending. The device economically recovers polymer blends and waste thermoset material by first preforming a thermoset material from disparate polymers and then melt blending the thermoset material with a thermoplastic material into useful products. The same type apparatus can be utilized in melt blending the shredded, used end caps of the invention, even where contaminated with oils and other oil field materials.

In the thermokinetic mixing process, polymer is loaded within a chamber where a shaft with widely spaced projections spins at speeds on the order of 4000 rpm, shearing and fracturing pieces of polymer and impinging them upon the inside wall of the chamber. While some thermokinetic mixers raise the temperature of polymers from ambient to as much as 620° F. in 20 to 25 seconds or less, the present method contemplates producing the output molten blend at temperatures on the order of about 320° F. or lower in order to prevent flashing of the corrosion inhibitor. This temperature will vary with the flash point of the selected inhibitor compound.

In the next step in the method, the molten, blended batch is released from the chamber of the thermokinetic mixer 31, preferably into a mold shown at step 33 in FIG. 3. The mold can conveniently be a two part mold operated by a hydraulic press provided with a water coolant cycle. Typical dwell time is on the order of five minutes at which point the mold halves are pulled apart and the pieces are removed. The molded end caps are then threaded on a lathe to the appropriate thread form in a step illustrated as 35 in FIG. 3.

Once manufactured, the thread protectors of the invention can be utilized in the customary fashion in the industry with the exception that a thread dope or heavy grease is not generally required. A light sealant composition may be applied to the threaded ends of the tubular, if desired. In a typical operation, the cut part is first inspected and accepted. A water displacement composition such as CRC 336, WD-40 or bactericide may be utilized in the cutting fluid. The product may then have a slight sealant applied such as the PRESERVE-A-THREAD product from Hunting Composite of Houston, Tex. The PRESERVE-A-THREAD compound is a corrosion inhibitor which can be sprayed or brushed onto the threads. The formulation contains no phosphates and is non-toxic, anti-microbial and biodegradable and recleaning prior to running the tubular is not generally necessary. The thread protectors of the invention can then be screwed into engagement on the pipe ends.

Figure 4:
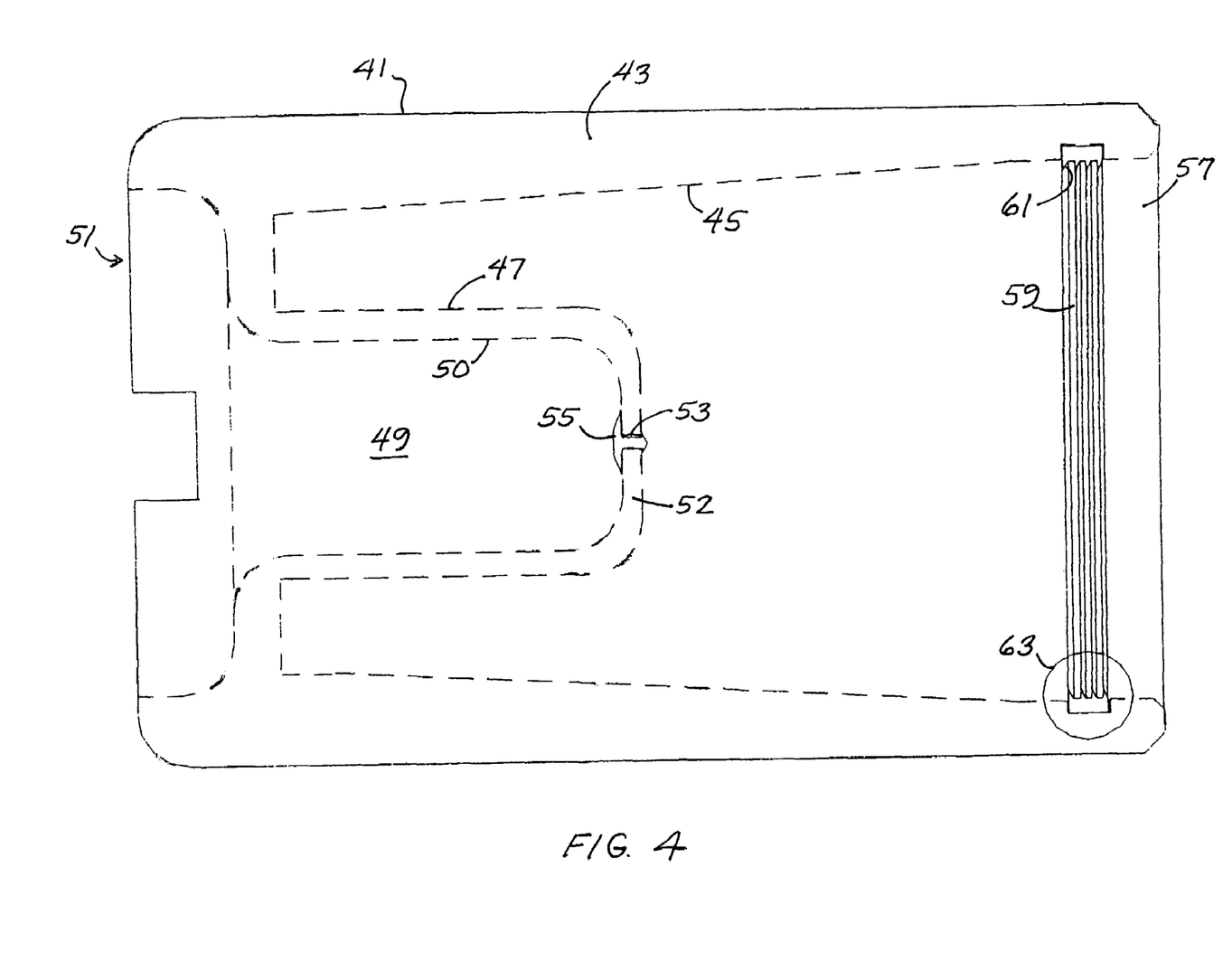
FIG. 4 is a cross-section view along a longitudinal axis of one embodiment of a pin thread protector with a weather barrier according to the present invention.

Referring to FIG. 4, there is illustrated a cross-section view along a longitudinal axis of one embodiment of a pin thread protector 41 with a weather barrier feature according to the present invention. The pin thread protector 41, also known as a pin protector 41, includes a cylindrical sidewall 43 having an internal surface 45, which may or may not be threaded to match the threads at the pin end of a drill pipe (not shown). In some applications, the inside diameter of the inside surface 45 of the pin protector 41 may diminish slightly from a first end 57 of the pin protector 41 to a second end 51 of the pin protector 41. The second end 51 is preferably open but may be closed to suit a particular application. A cylindrical, coaxially-disposed vent tube 47 having a transverse partition 52, formed intermediate the first end 57 and the second end 51 of the pin protector 41, separates the first and second ends 57, 51. The transverse partition 52 also defines a vent chamber 49. The vent chamber 49 is part of the space outside of the tubular goods. The transverse partition 52 of the vent chamber 49 preferably includes a vent 53 that passes through the transverse partition 52 and a vent valve 55 disposed in the vent 53. The vent 53 permits air from a region of higher pressure to flow into a region of lower pressure while minimizing the ingress of moisture or other contaminants into the tubular good. Thus, the transverse partition 52 separates the internal space of the tubular good from the space outside the tubular good.

Continuing with FIG. 4, in the first end 57 of the pin protector 41 a weather barrier ring 59 is seated in a groove provided around the inside surface 45 of the cylindrical wall 43 of the pin protector 41. The weather barrier ring 59 preferably includes a plurality of circumferential wiper blades 61 disposed around the inside diameter of the weather barrier ring 59. The weather barrier ring 59 is preferably fabricated of low density polyethylene (LDPE) material. The weather barrier ring 59 seals against the intrusion of water or moisture-laden air into the drill pipe protected by the pin protector 41. The vent valve 55 acts to prevent excess internal pressure within the drill pipe from loosening or distorting the pin protector and degrading the sealing performance of the weather barrier ring 59 provided by the present invention.

Figure 4A:
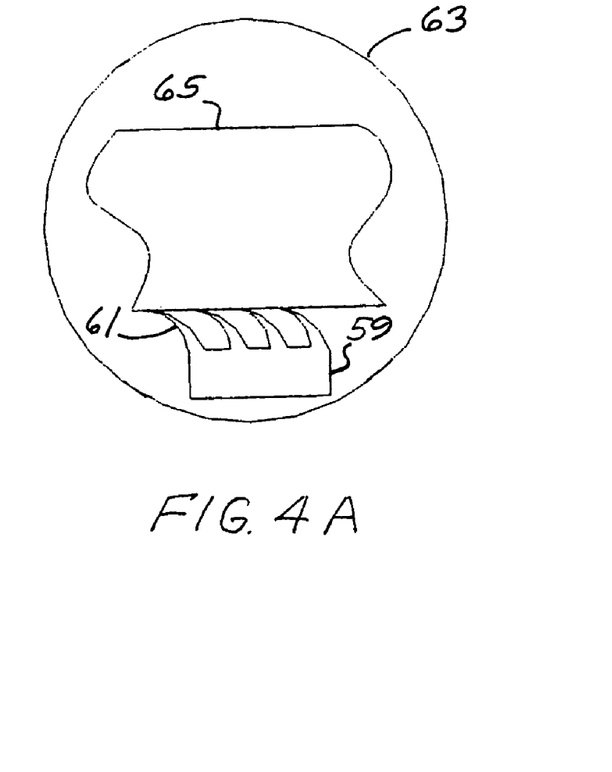
FIG. 4A is a partial cross-section view of the pin thread protector of FIG. 4 installed over the pin end of a drill pipe, showing a weather barrier ring and wiper blade seals against the drill pipe.

Referring to FIG. 4A, there is illustrated a partial cross-section view 63 (see also FIG. 4) of the pin protector 41 of FIG. 4 installed over the pin end of a drill pipe, showing the weather barrier ring 59 and the wiper blades 61, in a deflected position, bearing against an outside surface of a pipe wall 65 of the drill pipe to provide the pin protector 41 having the weather barrier seal of the present invention.

Figure 5:
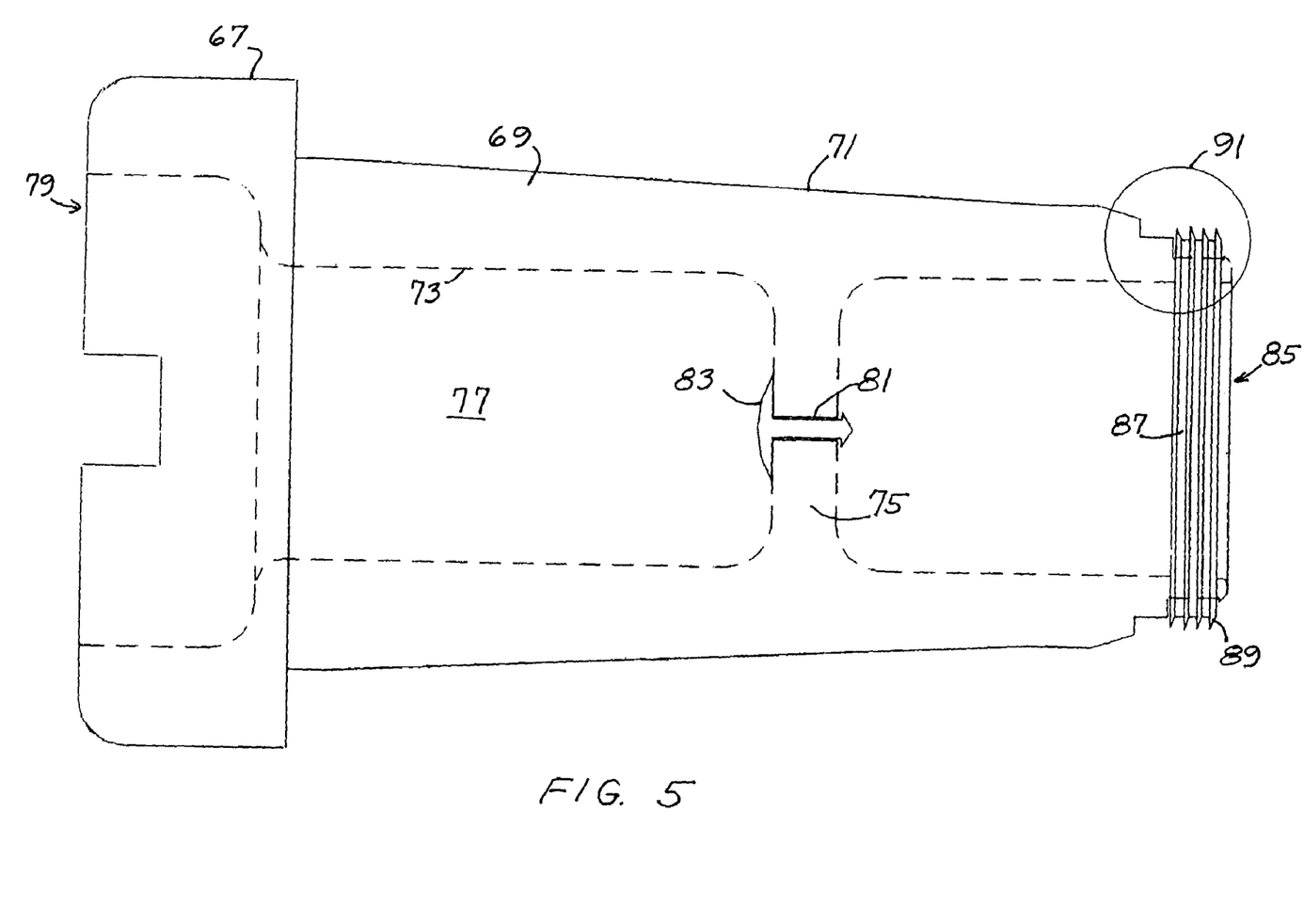
FIG. 5 is a cross-section view along a longitudinal axis of one embodiment of a box thread protector with a weather barrier according to the present invention.

Referring to FIG. 5, there is illustrated a cross-section view along a longitudinal axis of one embodiment of a box thread protector 67 with a weather barrier feature according to the present invention. The box thread protector 67, also known as a box protector 67, includes a cylindrical sidewall 69 having an external surface 71, which may or may not be threaded to match the threads at the end of a drill pipe (not shown). In some applications, the outside diameter of the cylindrical wall 69 may diminish slightly from a second end 79 toward a first end 85 to correspond with drill pipe box ends having tapered threads. The second end 79 is preferably open but may be closed to suit a particular application. The cylindrical sidewall 69 encloses a coaxial, cylindrical space within the internal surface 73. A transverse partition 75, disposed at a right angle to a longitudinal axis of the box protector 67 and intermediate the first end 85 and the second end 79, separates the first and second ends 85, 79. The transverse partition 75 also defines a vent chamber 77 near the second end 79. The vent chamber 77 is part of the space outside of the tubular good. The transverse partition 75 of the vent chamber 77 preferably includes a vent 81 that passes through the transverse partition 75 and a vent valve 83 disposed in the vent. The vent 81 permits air from a region of higher pressure to flow into a region of lower pressure while minimizing the ingress of moisture or other contaminants into the tubular good. Thus, the transverse partition 75 functions to separate the interior space of the tubular good from the space outside the tubular good.

Continuing with FIG. 5, disposed around the inner open end 85 of the box protector 67 is a weather barrier ring 87 seated in a groove 97 (see FIG. 5A) provided around the external surface 71 of the cylindrical wall 69 of the box protector 67. The weather barrier ring 87 preferably includes a plurality of circumferential wiper blades 89 disposed around the outside diameter of the weather barrier ring 87. The weather barrier ring 87 is preferably fabricated of LDPE material. The weather barrier ring 87 seals against the intrusion of water or moisture-laden air into the drill pipe protected by the box protector 67. The vent valve 83 acts to prevent excess internal pressure within the drill pipe from loosening or distorting the box protector 67 and degrading the sealing performance of the weather barrier ring 87 provided by the present invention.

Figure 5A:
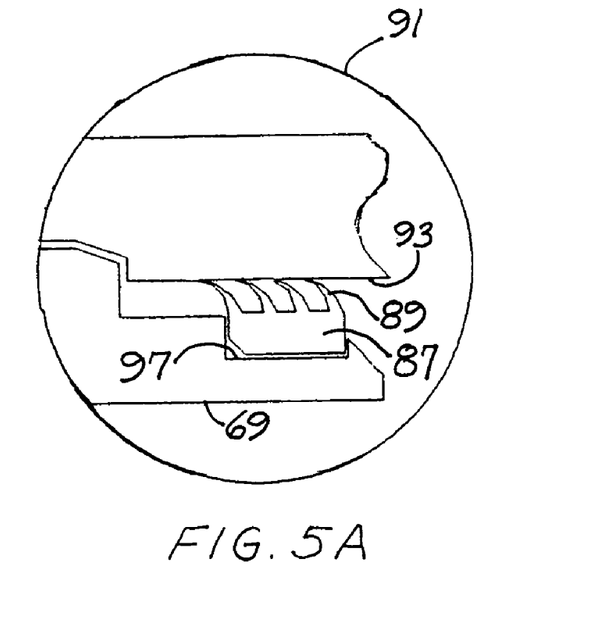
FIG. 5A is a partial cross-section view of the box thread protector of FIG. 5 installed in the box end of a drill pipe, showing a weather barrier ring and wiper blade seals against the drill pipe.

Referring to FIG. 5A, there is illustrated a partial cross-section view 91 (see also FIG. 5) of the box thread protector 67 of FIG. 5 installed on the box end of a drill pipe, showing a weather barrier ring 87 and wiper blades 89, in a deflected position, bearing against an inside surface 73 of the cylindrical pipe wall 69 of the drill pipe to provide the box protector 67 having the weather barrier seal of the present invention.

An invention has been provided with several advantages. The thread protectors of the present invention do not require typical thread dope compounds to provide corrosion and moisture protection. Because thread dope compounds containing hazardous materials are not required, the used end protectors can be more easily recycled and pose less danger of environmental contamination. The thread protectors of the invention can be used with a light sealing composition and do not require harsh solvents of the type used to clean traditional dope compounds. The thread protectors of the invention offer the same degree of corrosion protection while utilizing more environmentally friendly materials. The thread protectors can be recycled for reuse even with field residue present. Because of the thermokinetic mixing process, which enables blending an additive element or compound into the polymeric material, heavy metals or other contaminants are encapsulated within the polymeric body and do not tend to leach into the environment. Further, the thread protectors can be recycled for reuse even with field residue present. A weather barrier system may be incorporated into the thread protector to provide increased protection from the effects of moisture or other contaminants.

While the invention has been shown in one of its forms, it is not thus limited and is susceptible to various changes and modifications without departing from the spirit thereof.

We claim:

1. An improved thread protector for tubular goods having threaded ends, the improved thread protector comprising:
   a polymeric body having cylindrical wall portions defining an interior space therewithin and further having a transverse partition disposed intermediate a first end and a second end of the interior space, wherein the cylindrical wall portions of the first end engage and enclose the threaded ends of the tubular goods;
   an air vent provided in the transverse partition of the polymeric body for equalizing air pressure inside the tubular goods with air pressure outside the tubular goods while limiting the passage of moisture therethrough;
   a weather barrier incorporated in the polymeric body for maintaining a moisture resistant seal between the polymeric body and the tubular goods;
   wherein the polymeric body includes a corrosion inhibiting compound impregnated into the polymeric body during molding of the polymeric body, the material of the polymeric body itself and the inclusion of the corrosion inhibiting compound resulting in a molded polymeric body which does not transmit light and is therefore opaque; and
   wherein the weather barrier comprises a weather barrier ring disposed at the first end and around the polymer body for providing a weather resistant seal between the polymer body and a surface of the tubular goods adjacent the threads on the tubular goods away from an end of the tubular goods protected by the improved thread protector.

2. The improved thread protector of claim 1, wherein the polymeric body is formed from a material selected from the group consisting of polyethylene, polypropylene, polyurethane, polyvinylchloride, styrene-butadiene copolymers, acrylics and polycarbonates.

3. The improved thread protector of claim 1, wherein the polymeric body forms an end cap wherein an internal sidewall of the cylindrical wall portion of the first end contacts an externally threaded pin end of the tubular goods.

4. The improved thread protector of claim 1, wherein the polymeric body forms a cup shaped member wherein an external sidewall of the cylindrical wall portion of the first end contacts an internally threaded box end of the tubular goods.

5. The improved thread protector of claim 1, wherein the weather barrier ring comprises a resilient ring having one or more wiper blade edges formed around the entire length of the circumference for contacting the surface of the tubular goods to be sealed.

6. The improved thread protector of claim 5, wherein the wiper blade edges are formed so as to circumferentially contact an outside diameter of the tubular goods, possessing no open areas to allow the intrusion of water or moisture-laden air to enter.

7. The improved thread protector of claim 5, wherein the wiper blade edges are formed so as to circumferentially contact an inside diameter of the tubular goods, possessing no open areas to allow the intrusion of water or moisture-laden air to enter.

8. The improved thread protector of claim 5, wherein the air vent admits air flow into or out of the tubular goods.

9. The improved thread protector of claim 1, wherein the corrosion inhibitor has a characteristic flash point and wherein the flash point is selected to be above a mold temperature used to mold the polymeric body.

10. The improved thread protector of claim 1, wherein the polymeric body has incorporated therein from about 1 to 20% corrosion inhibitor by volume, based upon the total volume of the polymeric body.

11. The improved thread protector of claim 1, wherein the corrosion inhibitor is homogeneously dispersed and blended into the polymeric body during the mixing step.

12. In combination with an oil field tubular good having threaded ends:
   a sealant composition applied to the threaded ends; and
   a thread protector comprising:
      a polymeric body having cylindrical wall portions defining an interior space therewithin and further having a transverse partition disposed intermediate a first end and a second end of the interior space, wherein the cylindrical wall portions of the first end engage and enclose the threaded ends of the tubular goods;
      an air vent provided in the transverse partition of the polymeric body for equalizing air pressure inside the tubular goods with air pressure outside the tubular goods while limiting the passage of moisture therethrough;
      a weather barrier incorporated in the polymeric body for maintaining a moisture resistant seal between the polymeric body and the tubular goods;
      wherein the polymeric body includes a corrosion inhibiting compound impregnated in the polymeric body during molding of the polymeric body, the material of the polymeric body itself and the inclusion of the corrosion inhibiting compound resulting in a molded polymeric body which does not transmit light and is therefore opaque;
      wherein the weather barrier comprises a weather barrier ring disposed at the first end and around the polymer body for providing a weather resistant seal between the polymer body and a surface of the tubular goods adjacent the threads on the tubular goods away from an end of the tubular goods protected by the improved thread protector; and
      wherein the weather barrier ring comprises a resilient ring having one or more wiper blade edges formed around the entire length of the circumference thereof for contacting the surface of the tubular goods to be sealed.

13. The combination of claim 12, wherein the sealant composition is a liquid solution.

14. The combination of claim 12, wherein the sealant composition is a thread compound or grease.

15. The combination of claim 12, wherein the polymeric body forms an end cap with internal sidewalls which contact an externally threaded pin end of the tubular goods.

16. The combination of claim 12, wherein the polymeric body forms a cup shaped member with external sidewalls which contact an internally threaded box end of the tubular goods.

17. The combination of claim 12, wherein the wiper blade edges are formed so as to circumferentially contact an outside diameter of the tubular goods.

18. The combination of claim 12, wherein the wiper blade edges are formed so as to circumferentially contact an inside diameter of the tubular goods.

19. The combination of claim 12, wherein the air vent admits air flow into or out of the tubular goods.

20. The combination of claim 12, wherein the corrosion inhibitor has a characteristic flash point and wherein the flash point is selected to be above a mold temperature used to mold the polymeric body.

21. The combination of claim 12, wherein the polymeric body has permanently incorporated therein from about 1 to 20% corrosion inhibitor by volume, based upon the total volume of the polymeric body.

22. The combination of claim 12, wherein the corrosion inhibitor is homogeneously dispersed and blended into the polymeric body during the mixing step.

* * * * *